UNITED STATES PATENT OFFICE.

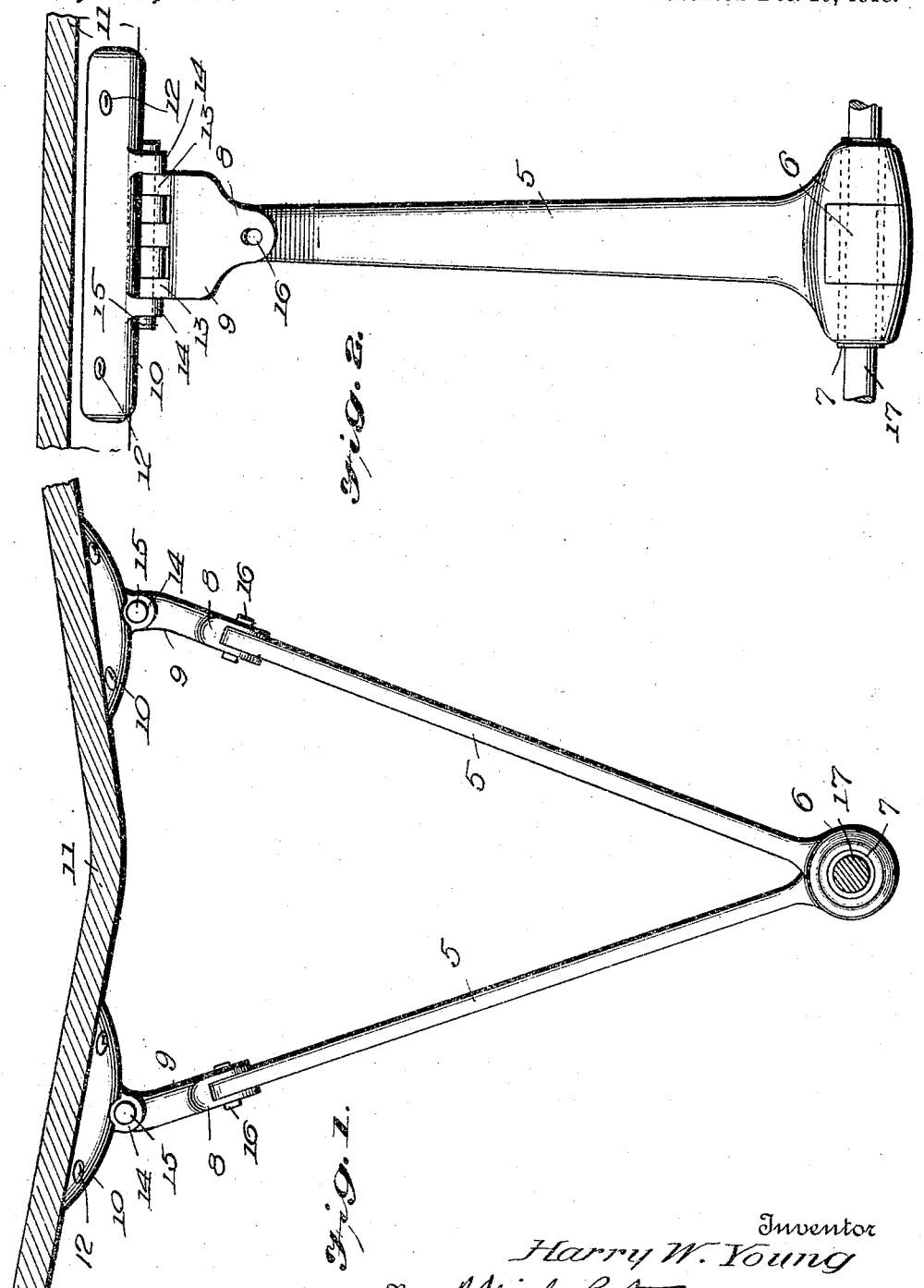

HARRY W. YOUNG, OF WHITEHALL, MICHIGAN.

SHAFT-HANGER.

1,287,166.  Specification of Letters Patent.  Patented Dec. 10, 1918.

Application filed April 30, 1917, Serial No. 165,467. Renewed April 27, 1918. Serial No. 231,275.

*To all whom it may concern:*

Be it known that I, HARRY W. YOUNG, a citizen of the United States, residing at Whitehall, in the county of Muskegon and State of Michigan, have invented new and useful Improvements in Shaft-Hangers, of which the following is a specification.

The hanger which is the subject matter of the present application for patent is designed more particularly for supporting propeller shafts, the hanger being constructed so that it can be readily adjusted to various angles of the hull bottom, thus obviating the necessity of hangers made to fit particular boats. The device can also be used as a substitute for a broken or worn hanger.

In order that the invention may be better understood, reference is had to the accompanying drawing forming a part of the specification, and in said drawings:

Figure 1 is a front elevation of the hanger; and

Fig. 2 is a side elevation thereof.

Referring specifically to the drawing, 5 denotes two bracket arms which are formed at one end with matching hinge knuckles 6 to provide a pivotal connection between said arms. These knuckles are suitably dimensioned to also serve as the bearing of the hanger, they being provided with alined openings to receive a liner sleeve 7 which also completes the hinge joint. By this hinge connection between the bracket arms, said arms may be set so as to extend divergingly from the bearing as shown in Fig. 1, and they may be spread or gathered as desired.

To the inner end of each bracket arm 5 is connected a yoke 8 on an attaching member 9 carried by a base plate 10 which is secured to the hull bottom 11 by screws or other suitable fasteners 12. The member 9 has hinge knuckles 13 which match with hinge knuckles 14 on the plate 10, and by means of a pin 15 passing through said knuckles, a pivotal or hinge connection is had between the member 9 and the plate 10. A rivet or other fastener 16 passing through the arm 5 and the branches of the yoke 8 provides a connection between said arm and the yoke.

It will be seen from the foregoing that the bracket arms 5 are pivotally connected to the base plate 10, which, together with the pivotal connection between the arms enables the angular adjustment of the latter hereinbefore described, to be readily made, and the hanger can be set to adapt itself to any variations in the angle of the hull bottom 11. By properly spreading the bracket arms 5, the bearing portions thereof can be carried to the proper position with respect to the propeller shaft 17. The parts will be tightly fitted so that after the proper adjustment is made, there will be no looseness.

I claim—

1. A shaft hanger comprising a pair of bracket arms having matching hinge knuckles at one of their ends, said knuckles having alined openings to form a shaft bearing, a liner sleeve seating in said openings, and supporting means at the other ends of the arms.

2. A shaft hanger comprising a pair of bracket arms having matching hinge knuckles at one of their ends, said knuckles having alined openings to form a shaft bearing, a liner sleeve seating in said openings, a pair of base plates, and a pivotal connection between said base plates and the respective bracket arms.

3. A shaft hanger comprising a pair of bracket arms pivotally connected at one end, said pivotally connected ends of the arms having alined openings to form a shaft bearing, and supporting means for the arms at the other ends thereof.

4. A shaft hanger comprising a pair of bracket arms pivotally connected at one end, said pivotally connected ends of the arms having alined openings to form a shaft bearing, a pair of base plates, and a pivotal connection between said base plates and the respective bracket arms.

5. A shaft hanger comprising a pair of bracket arms having matching hinge knuckles at one of their ends, said knuckles having alined openings to form a shaft bearing, and supporting means at the other ends of the arms.

6. A shaft hanger comprising a pair of bracket arms having matching hinge knuckles at one of their ends, said knuckles having alined openings to form a shaft bearing, a pair of base plates, and a pivotal connection between said base plates and the respective bracket arms.

In testimony whereof I affix my signature.

HARRY W. YOUNG.

Copies of this patent may be obtained for five cents each, by addressing the "Commissioner of Patents, Washington, D. C."